United States Patent
Broder et al.

[19]

[11] Patent Number: 6,073,135
[45] Date of Patent: Jun. 6, 2000

[54] CONNECTIVITY SERVER FOR LOCATING LINKAGE INFORMATION BETWEEN WEB PAGES

[75] Inventors: Andrei Z. Broder, Menlo Park; Michael Burrows, Palo Alto; Monika H. Henzinger, Menlo Park; Sanjay Ghemawat, Mountain View; Puneet Kumar, Palo Alto; Suresh Venkatasubramanian, Stanford, all of Calif.

[73] Assignee: Alta Vista Company, Palo Alto, Calif.

[21] Appl. No.: 09/037,350

[22] Filed: Mar. 10, 1998

[51] Int. Cl.[7] .................................................. G06F 17/30
[52] U.S. Cl. ................................. 707/100; 707/10; 707/2; 707/3; 707/7
[58] Field of Search ............................. 707/100, 10, 102, 707/513, 2, 3, 7

[56] References Cited

U.S. PATENT DOCUMENTS

| | | | |
|---|---|---|---|
| 5,712,979 | 1/1998 | Graber et al. | 709/224 |
| 5,802,299 | 9/1998 | Logan et al. | 709/218 |
| 5,832,494 | 11/1998 | Egger et al. | 707/102 |
| 5,864,863 | 1/1999 | Burrows et al. | 707/103 |
| 5,870,559 | 2/1999 | Leshem et al. | 709/224 |
| 5,911,145 | 1/1999 | Arora et al. | 707/514 |

*Primary Examiner*—Anton W. Fetting
*Assistant Examiner*—Greta Robinson
*Attorney, Agent, or Firm*—Pennie & Edmonds LLP

[57] ABSTRACT

A server computer is provided for representing and navigating the connectivity of Web pages. The Web pages include links to other Web pages. The links and Web page s have associated names (URLs). The names of the Web pages are sorted in a memory of the connectivity server. The sorted names are delta encoded while periodically storing full names as checkpoints in the memory. Each delta encoded name and checkpoint has a unique identification. A list of pairs of identifications representing existent links is sorted twice, first according to the first identification of each pair to produce an inlist, and second according to the second identification of each pair to produce an outlist. An array of elements is stored in the memory, there is one array element for each Web page. Each element includes a first pointer to one of the checkpoints, a second pointer to an associated inlist of the Web page, and a third pointer to an associated outlist of the Web page. The array is indexed by a particular identification to locate connected Web pages.

23 Claims, 9 Drawing Sheets

CONNECTIVITY SERVER FOR LOCATING LINKAGE INFORMATION BETWEEN WEB PAGES

FIELD OF THE INVENTION

This invention relates generally to information retrieval systems, and more particularly to retrieving information according to how the information is linked.

BACKGROUND OF THE INVENTION

The World Wide Web (Web) connects numerous client and server computers all over the world via the Internet. Users of the client computers employ Web browsers to locate Web pages. Pages are located according to names called Uniform Resource Locators (URLs). Specialized servers called search engines maintain indices of the content of Web pages. The browsers are used to pose textual queries, and in response the search engines return result sets of URLs that identify Web pages that satisfy the queries. Usually, the result sets are rank ordered according to their relevance. The URL names of the result sets can then be used to retrieve the identified Web pages, and other pages connected by "hot links."

However, some users are interested in more than just the content of the Web pages. These users are interested in how Web pages are connected to each other. In other words, these users are interested in exploring the connectivity information embedded within the Web for practical, commercial, or other reasons.

The connectivity information provided by the search engines is only a byproduct. An unsophisticated user can easily follow a trail, but to extract a more global view of connectivity is tedious. The connectivity representation in the search engines is for a single purpose: to provide answers to queries. However, to determine all pages two links removed from a particular page may require thousands of queries and substantial amount of processing by the user. Without a separate representation of the Web, it is very difficult to provide linkage information. In fact, most search engines do not provide access to any type of connectivity information.

Linkage information between web pages is a valuable resource for Web visualization and page ranking. Several ongoing research projects use such information. Most connectivity information is obtained from ad-hoc Web "crawlers" that build relatively small databases of local linkage information. A database is either built on the fly, or statically. On the fly, each new page reached is parsed to locate the links. The linked neighboring pages are retrieved until the required connectivity information is gathered. For a static database, the database is essentially rebuilt from scratch whenever updates are required. For example, the service named Linkalert provided by Lycos (see "http://www.lycos.com/linkalert/Overview.htm"), uses static databases specifically designed to offer linkage information for particular Web sites. Both approaches are inefficient and clumsy to use, and do not extend to the entire Web and a large number of clients. Consequently, their implementations generally perform poorly and/or are limited in scope.

It is desired to provide a "connectivity server" that is easy to use, and efficient. The server should maintain accurate linkage information for a significant portion of the web. The server must support a large number of client users desiring many different types of connectivity information. In addition, the system must dynamically update the connectivity information so that the linkage information is current.

SUMMARY OF THE INVENTION

The invention provides a connectivity server for the Web. On the Web, each Web page has an associated name called a Uniform Resource Locator (URL). The connectivity server can be used by client computers to locate other Web pages connected to a particular Web page by links also specified with URLs.

In the connectivity server, the linkage of the Web pages is represented as a graph. Each node of the graph represents a Web page, and each edge represents a link from one page to another. The graph is constructed and navigated as follows.

First, the names of a significant portion of Web pages are sorted in a memory. These names can be obtained from a Web search engine. The sorted names are delta encoded. That is, each delta value stores the difference between a current name and the previous name in the sort order.

Periodically, a full name is stored as a checkpoint. The checkpoints can be searched using, for example, a binary search technique, to locate the closest checkpoint to a particular name. Each delta encoded name and checkpoint has a unique identification of a node that represents the Web page.

A list of pairs of identifications is constructed. The first identification of each pair identifies a particular Web page, and the second identification identifies a page that contains a link to the particular page. The list is sorted twice, first according to the first identification of each pair to produce an inlist, and second according to the second identification of each pair to produce an outlist. The inlist and outlist are used to form the edges of the graph. Each edge is represented twice, once for each direction.

Next, an array of elements is stored. There is one array element for each Web page. Each array element includes a first pointer to the checkpoint to be used to determine the full URL of the page, a second pointer to an associated inlist of Web pages represented as array elements, and a third pointer to an associated outlist of Web pages represented as array elements. The array elements are the nodes of the graph, and the inlists and outlists encode the edges of the graph.

A client user specifies a name (URL) of a Web page for which the connectivity is desired. The name is converted to one of the identifications using the delta-encoded names. Scanning of the encoded names begins at the closest checkpoint. Once the identification is determined, the identification can be used as an index into the array. The second and third pointers can then be used to locate connected pages.

DETAILED DESCRIPTION OF PREFERRED EMBODIMENTS

Figure 1:
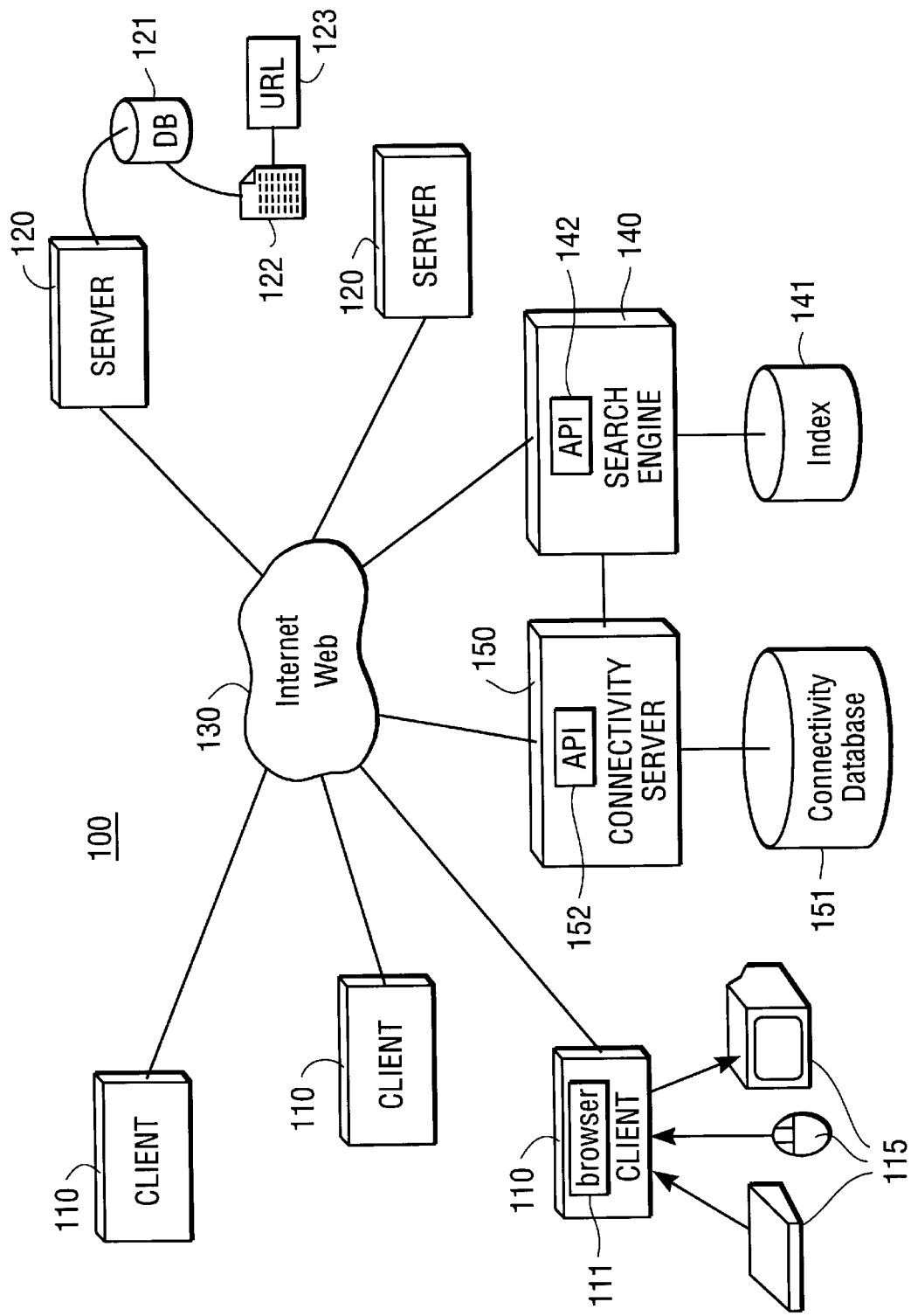
FIG. 1 is a block diagram of distributed computer system including a connectivity server according to the invention.

As shown in FIG. 1, a widely distributed network (the "Web") of computers 100 includes numerous client computers 110 connected to server computers 120 by a network 130. Generally, the servers 120 provide information, products, and services to users of the clients 110.

The client computers 110 can be personal computers, workstations, or laptops. Typically, the clients are equipped with input/output devices 115, such as a keyboard, mouse, and display device 115. Software in the form of a Web browser 111 interacts with the devices 115 to provide an interface between the user and the Web.

The server computers 120 are usually larger computer systems, although this does not always need to be so. Some of the servers, also known as "Web sites," maintain a database (DB) 121 of Web pages 122. Each Web page 122 is identified and can be located by its name, e.g., a URL 123. Web pages are usually formatted using the HyperText Markup Language (HTML). HTML provides for "links" to other pages. A user can "click" on a link within a page viewed with the browser to retrieve a "pointed to" page.

Some servers 140, known as "search engines", maintain an index 141 of the content of Web pages. Using a search engine application programming interface (API) 142, client users can locate pages having specific content of interest. The user specifies pages of interest to the API of the search engine 140 by composing queries that are processed by the search engine's API 142.

The invention provides another specialized server, that is, a "connectivity" server 150. The connectivity server 150 maintains a connectivity database 151. Using a connectivity server API 152, users can locate pages (URLs) according to how they are connected.

Figure 2:
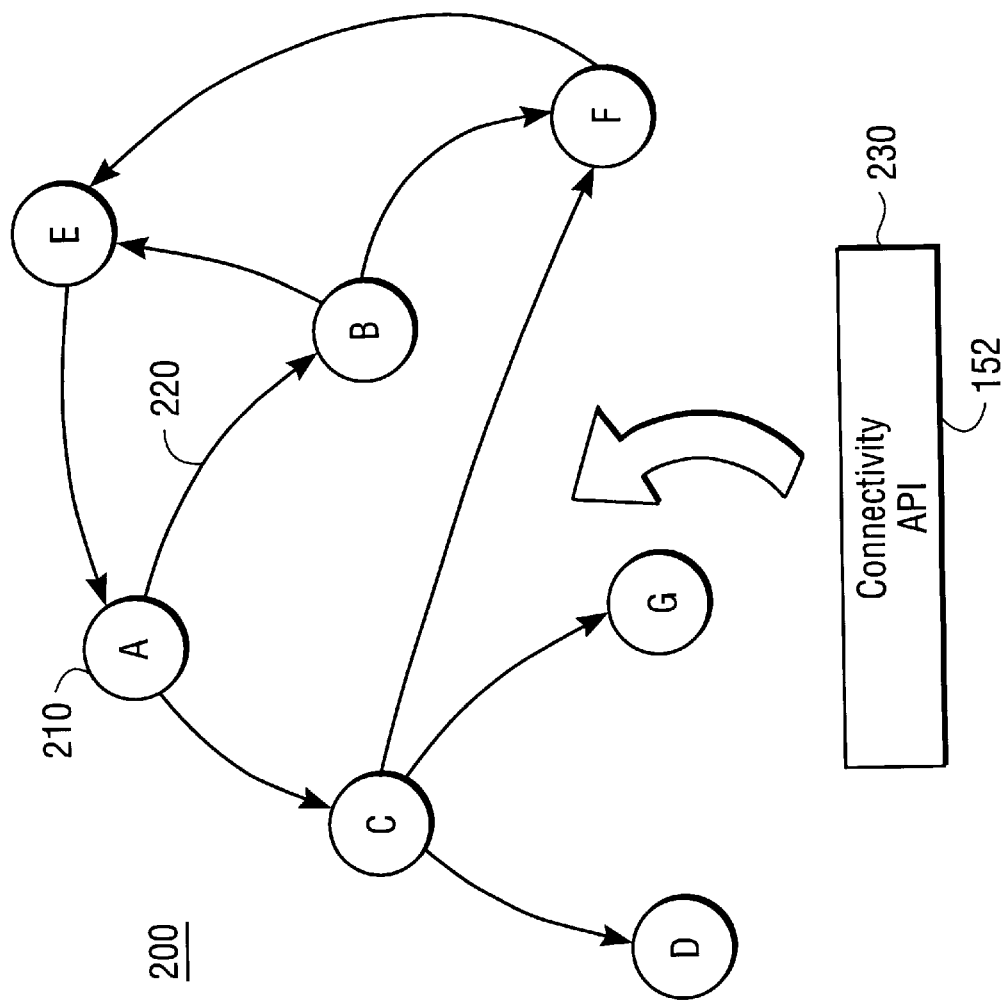
FIG. 2 is a graph maintained in a memory of the connectivity server to represent the linkage of Web pages.

As shown in FIG. 2, a graph 200 is built to represent the connectivity of the Web pages. In the graph 200, each node (A, . . . , G) 210 represents a Web page 122. Each edge, for example, an edge (A B) 220 represent a link from one page to another. The connectivity API 152, in various forms, enables client users to "explore" or "navigate" the graph 200 to extract connectivity information.

The data representation of the graph 200 in memory must be carefully designed for space efficiency. If the graph contains about 100 M Web pages with an average outdegree seven, then the graph will have about 700 M edges. A naive implementation would store two pointers per edge. Furthermore, considering that the average size of a URL is about eighty bytes, just the uncompressed names (URLs) of the nodes in a naive implementation will occupy about 8 Gigabytes According to the invention, the graph 200 is built, maintained, and traversed as follows. Preferably, the input for building the graph comes from the search engine 140. It should be understood that the input for constructing the graph could also come from other sources.

Figure 3:
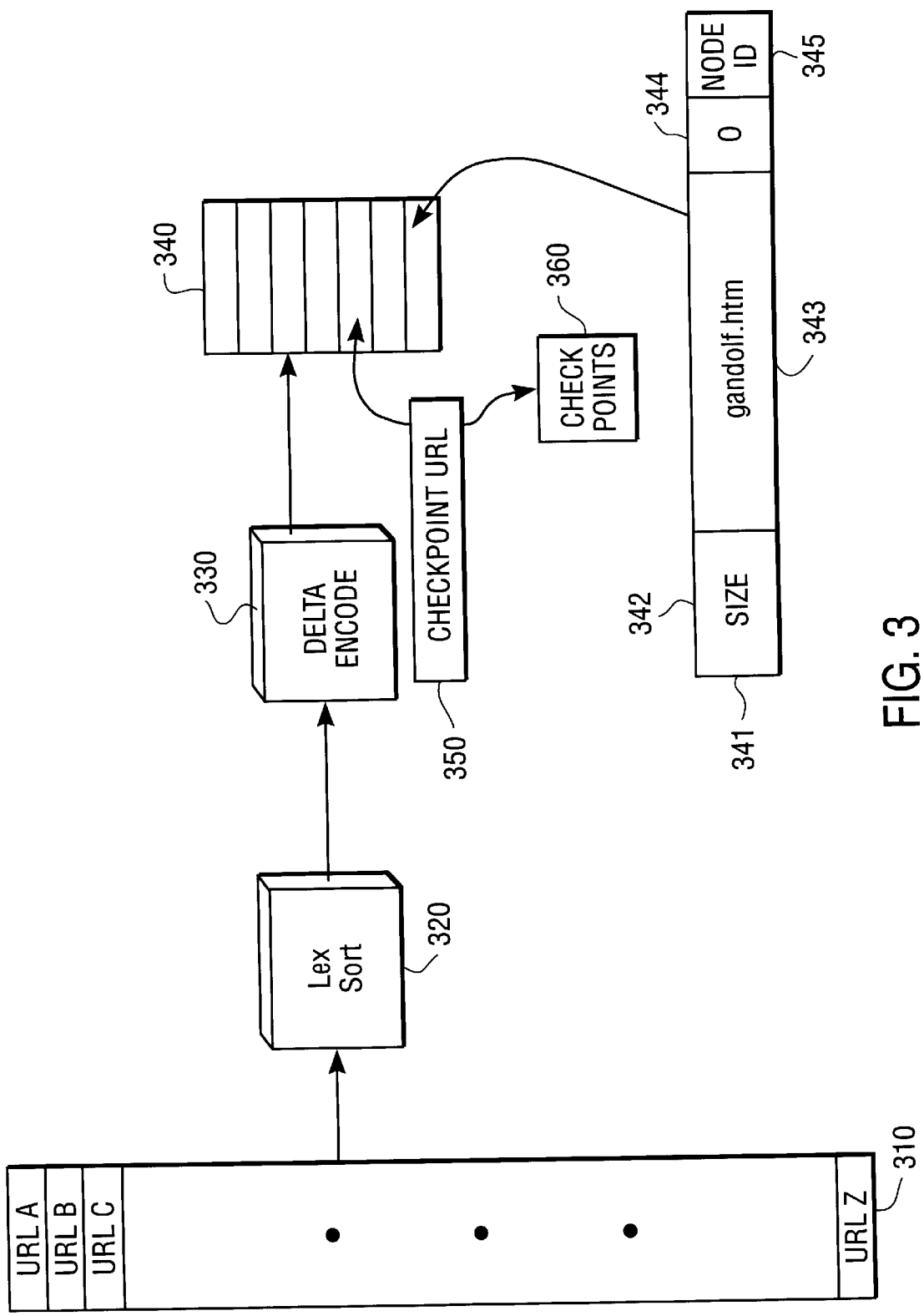
FIG. 3 is a flow diagram of a process for encoding names of Web pages.

As shown in FIG. 3, the input for building the graph 200 is a set of URLs {URL A, . . . , URL Z} 310. The set 310 identifies known Web pages 122. The URLs or names of the set 310 are first lexicographically sorted (320). Next, the sorted URLs are delta encoded (330) to produce a list 340. In the list 340, each entry 341 is stored as a difference (delta) between the current URL and a previous URL. Because pages maintained at the same site are going to have a fairly large prefix portion in common, storage reduction due to delta encoding is considerable. For a hundred million URLs, storage is reduced by about 70%.

For example, if the input URLs 310 are:
www.foobar.com/
www foobar.com/gandalf.html
www.foograb.com/, then the output delta encoded URLs 340 are:

| | |
|---|---|
| 0 | www.foobar.com/ |
| 14 | gandalf.html |
| 7 | grab.com/ |

More precisely, each entry 341 of the list 340 includes the following fields: a size field 342 that indicates the number of common bytes with the previous URL; a delta field 343 that stores the bytes that are different than the shared prefix, terminated by a zero byte 344; finally, a field (Node ID) 345 identifies the node that represents the corresponding page.

Delta encoding URL values comes at a price, namely increased processing during an inverse translation to recover a full URL. In order to recover a complete URL, one needs to start with the first entry of the list 340 and linearly apply all delta values 342 until the URL under consideration is reconstructed.

The present invention overcomes this problem by periodically remembering an entire URL as a checkpoint URL entry 350. The checkpoints 350 can be maintained as a separate sorted list 360 on which a binary search can be applied. Thus, once the closest preceding checkpoint URL 350 has been located, only the delta values from that point on need to be applied. The cost of inverse translation can be controlled by the number of entries 350 in the checkpoint list 360. In the preferred embodiment, a checkpoint entry is maintained for about every thousand bytes of URL data in the list 340.

Figure 4:
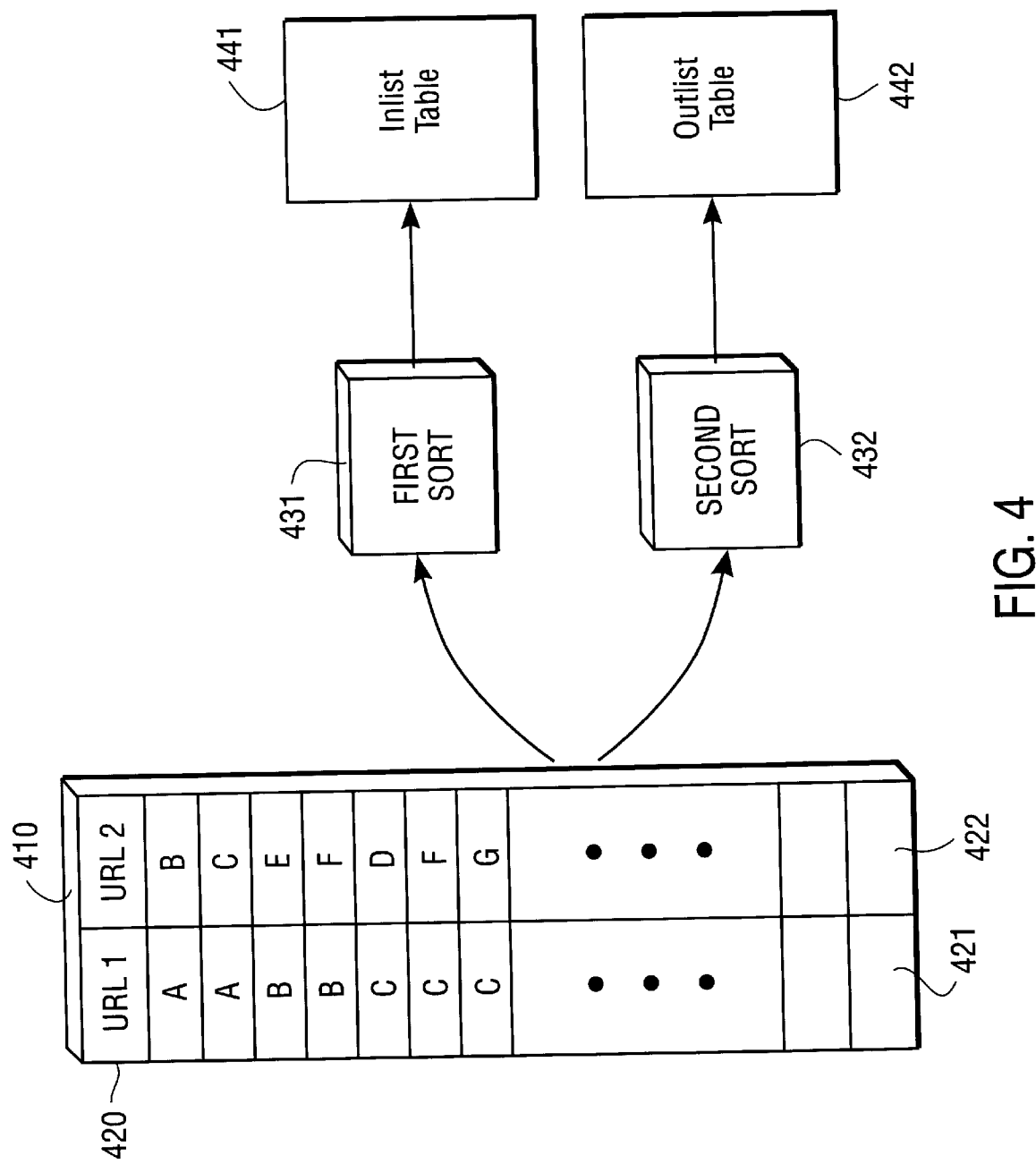
FIG. 4 is a flow graph of a process for generating linkage tables of the Web pages.

As shown in FIG. 4, the edges of the graph 200 are constructed from a list of pairs 410. Each pair 420 includes the node ID of a first page (URL1) 421, and a second node ID (URL2) 422 of a second page that contains a link to the first page. The pairs 420 essentially indicate the connectivity of the pages. The pairs can be obtained from a search engine 140 or from other sources.

The list 410 is sorted twice (431, 432), first according to the first node ID 421 to produce an inlist table 441, and second according to the second node ID 422 to produce an outlist table 442. The inlist table contains only the second node id from each pair: the high order bit (bit 32) 450 of a list entry is set to indicate the end of a group of common connected nodes, that is a group of nodes that point to the same page P. The entry 510 (described below and in FIG. 5) corresponding to P contains a field 512 that points to the beginning of the group of nodes within the inlist that point to P. The outlist table is organized in a similar way. In other words, each edge 220 of the graph 200 is represented twice to indicate pages pointing to a particular page, and to indicate pages pointed to from a particular page.

Figure 5:
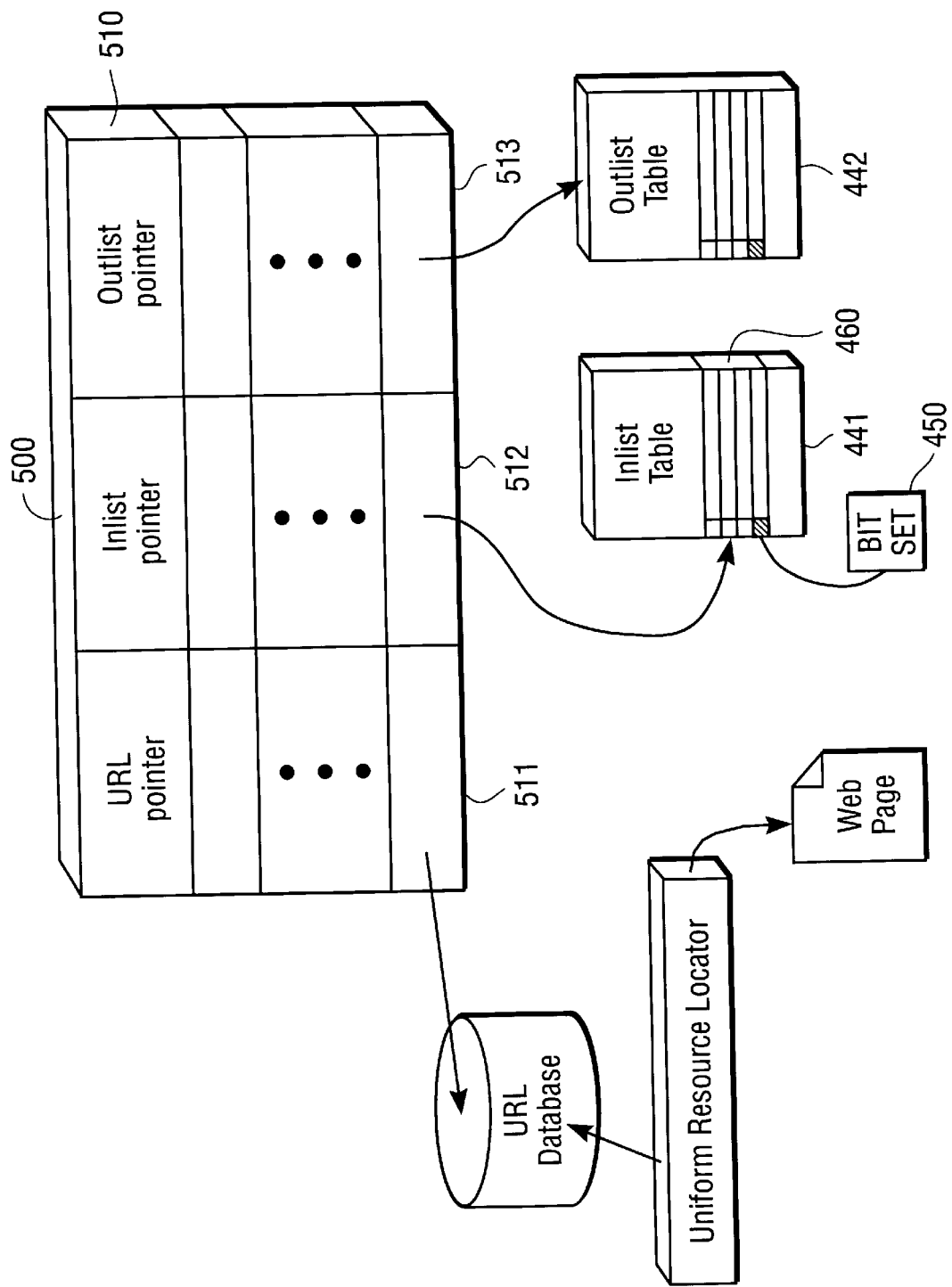
FIG. 5 is a block diagram of an array representing the graph.

As shown in FIG. 5, the graph 200 itself is maintained as an array 500. The nodes of the graph are represented by elements 510 of the array 500. Each element 510 includes three fields 511 513. Field 511 stores a pointer (URL pointer) to the delta-encoded list 340 of FIG. 3. Fields 512 and 513 point to the corresponding inlist 441 and outlist 442. In other words, field 511 points to the node name, field 512 points to the incoming edges, and field 513 points to the outgoing edges.

Figure 6:
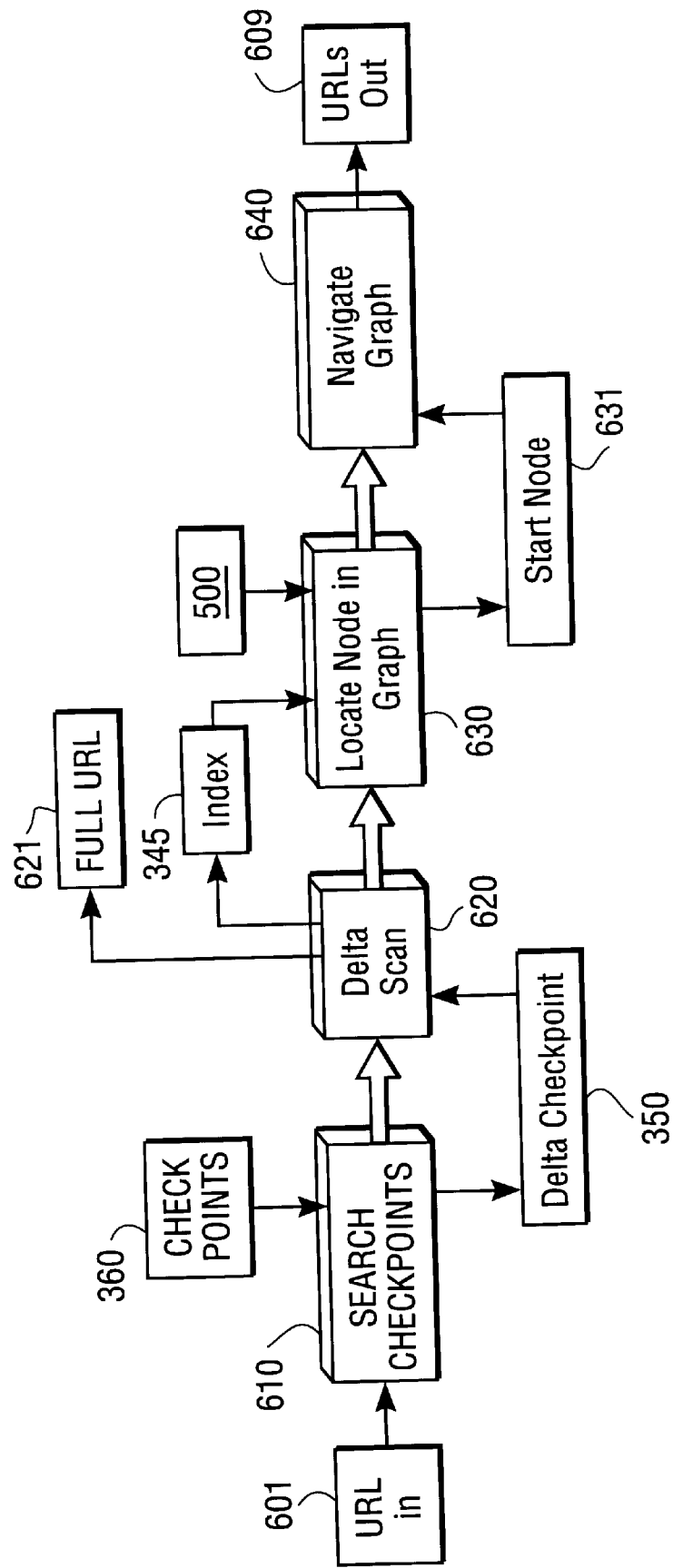
FIG. 6 is a flow diagram of a process for locating a node in the graph using the array.

As shown in FIG. 6, a user can explore the connectivity of the Web by supplying an input URL (URL in) 601. The input URL 601 is used to binary (or interpolation) search 610 the checkpoint list 360 to locate the closest delta checkpoint 350. Subsequently, delta values 343 are applied (Delta Scan 620) until a full URL 621 equal to the input 601 is recovered. The associated node ID 345 is used to index 630 the array 500. Indexing the array 500 locates a start node 631 from which connectivity can be explored in step 640. The graph 200 can be navigated to whatever depth desired using the inlist and outlist tables 441, 442 to produce an output list of URLs (URLs out) 609.

Figure 7:
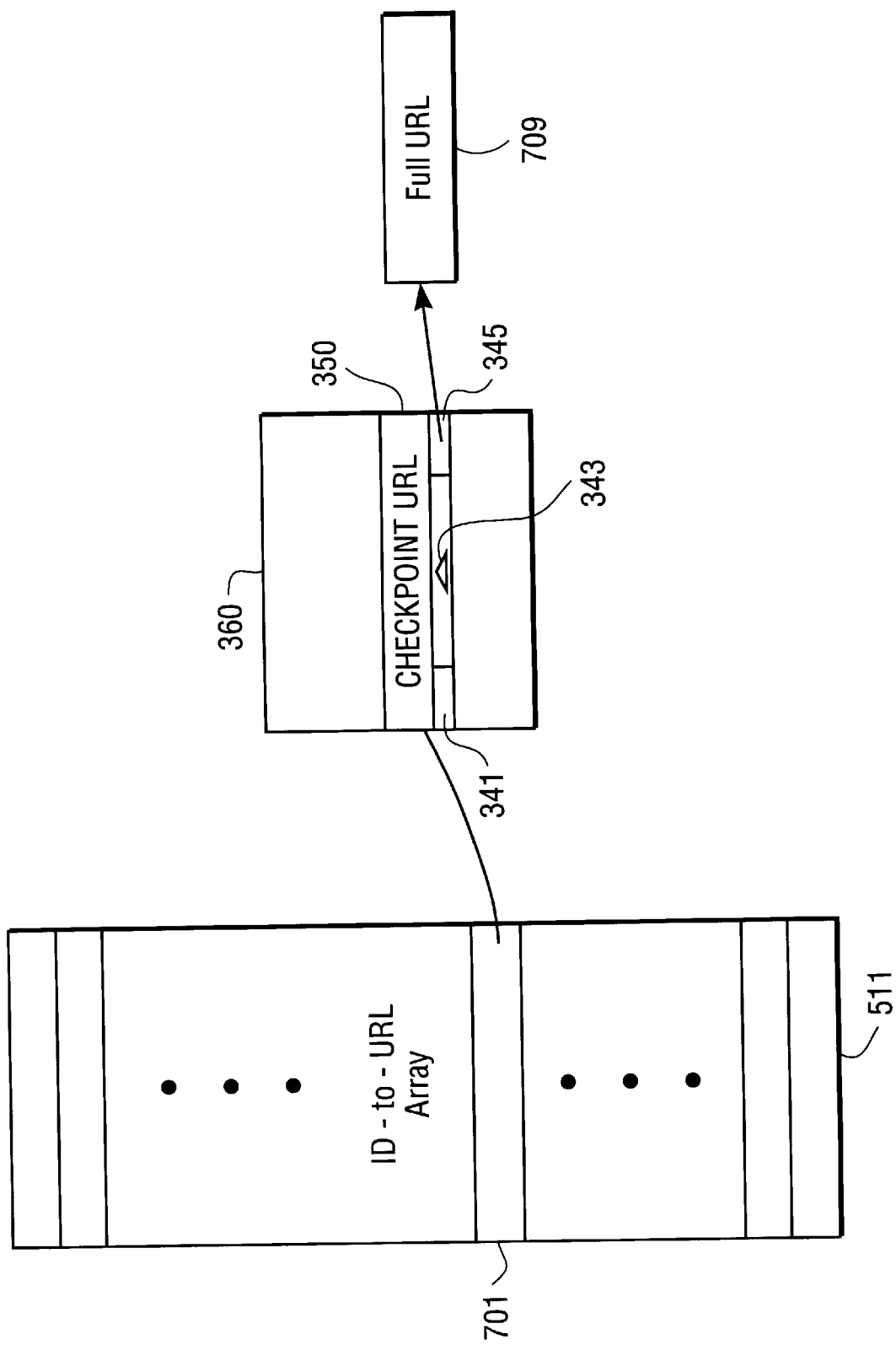
FIG. 7 is a flow diagram of a process for translating a node identification to a Web page name.

FIG. 7 shows in more detail a data structure (ID-to-URL Array) 511 that is used to recover a full URL from a node ID. In the array 511, there is one entry for each node 210 in the graph 200. Entries 701 point to the nearest checkpoint URL 350 for each node in the checkpoint list 360. Subsequent delta values 343 are applied until an entry with a matching node ID 345 is found. At this point, the full URL 709 has been recovered.

Figure 8:
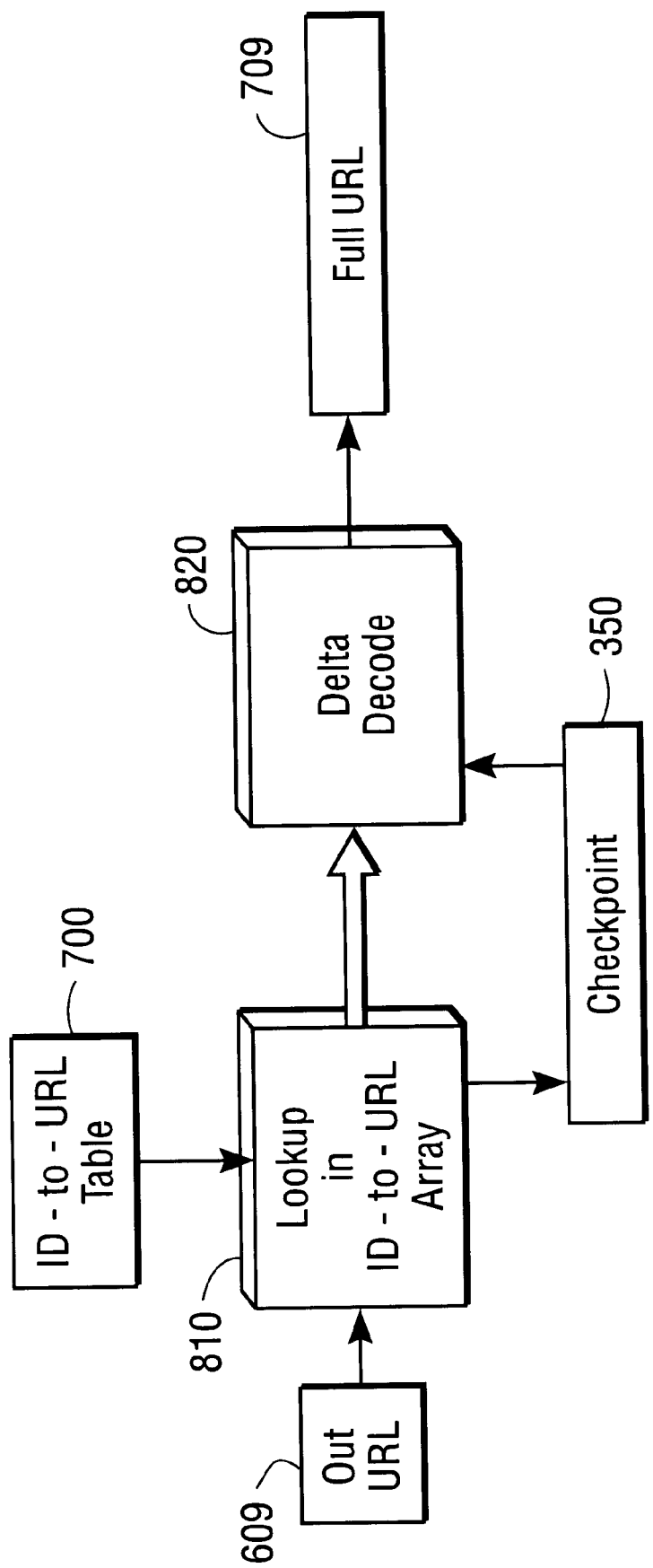
FIG. 8 is a block diagram of the connectivity server.

This process is illustrated in FIG. 8. The input to the process is one of the output URLs 609 of FIG. 6. The node ID is used as an index in the ID-to-URL table 511 to determine a closest checkpoint 350. Delta values are decoded until the matching node ID in field 345 is found at which point the full URL 709 has been recovered.

Figure 9:
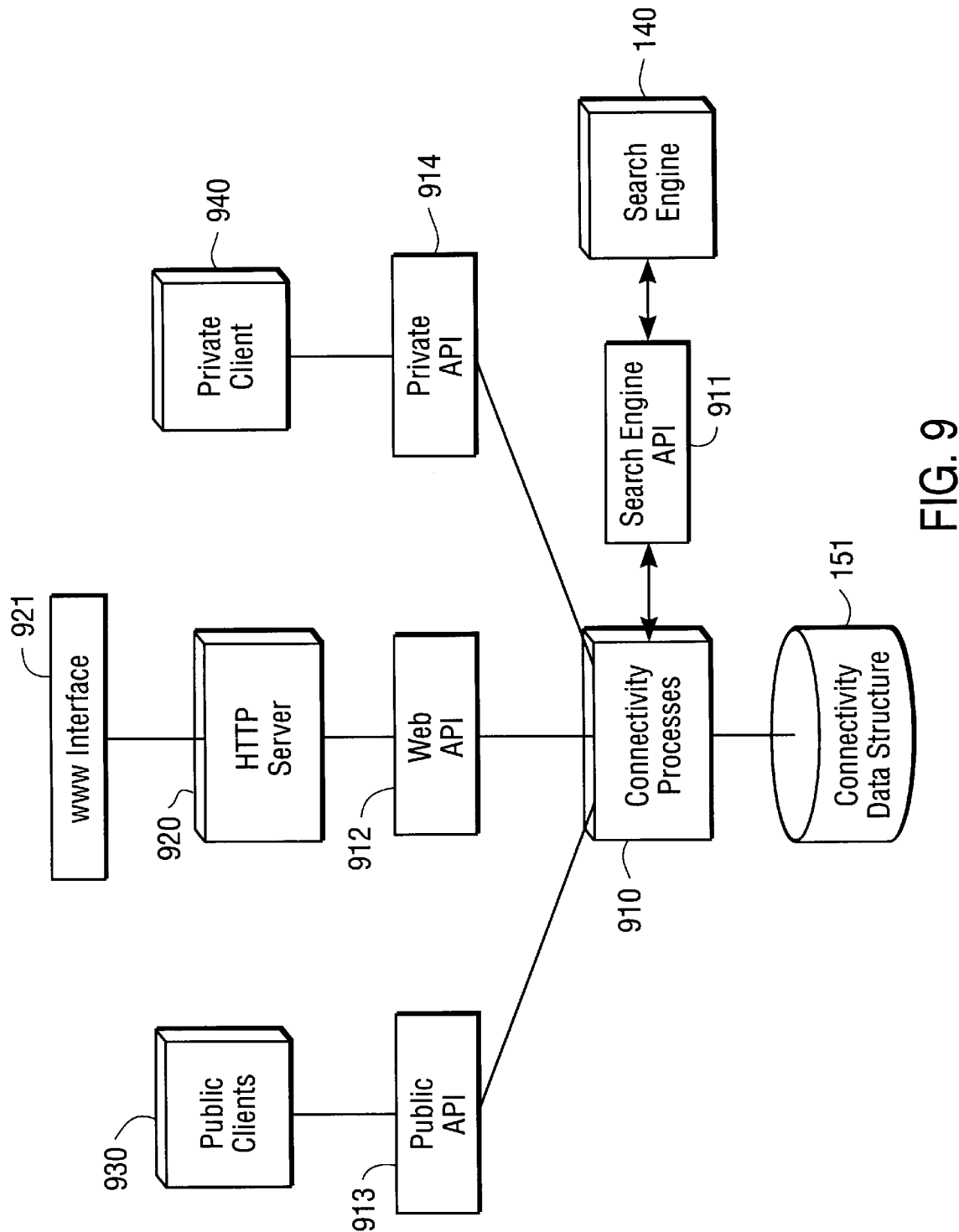
FIG. 9 is a block diagram of an exemplary embodiment of the overall structure of the connectivity server.

The overall structure of the connectivity server 150 is shown in FIG. 9. The connectivity data structures 151 are stored on a disk. The connectivity data structures 151 include the delta encoded list 340 of URLs, including checkpoints. The inlist and outlist tables 441 and 442, the node ID array 500, and the ID-to-URL array 511. Connectivity processes 910 can locate a starting node in the graph 200 for a given URL. The processes 910 can also navigate the graph 200 to locate connected nodes. The structure 151 can be updated to add new nodes and edges to represent newly found pages and links, or to delete portions of the graph for which Web pages are no longer accessible.

The connectivity server 150 includes the following application program interfaces (API). A first API 911 interfaces to the search engine 140. This interface is used to obtain the URLs of Web pages that are represented by the nodes of the graph. A Web API 912 is connected to a conventional Web HTTP server 920 to provide a WWW interface 921.

In addition, a public APIs 913 is provided for public clients 930, and a private API 914 is provided for private clients 940. The private API 914 allows access to more efficient data structures and processes for privileged users. A user gain access to the APIs with the browser 111 of FIG. 1.

A basic connectivity query is of the form: "List L", where L is the URL of a Web page. In response, the connectivity server supplies a list of all URLs pointing to Web page L, as well as all Web pages pointed to by page L.

A neighborhood query is of the form: "List L, D" where D specifies the degree of connectivity to be explored. Here the connectivity server's response will be a list of URLs at a distance D (measured as the number of edges) from page L. It should be understood that more complex queries could be composed specifying logical combinations of URLs and distances. A private query allows the user to pose queries in an internal format of the connectivity server, and the server's response can include more detailed information such as names of the servers storing the connected pages.

The invention provides linkage information for a significant portion of the Web. The information can be used by programs that rank Web pages according to their connectivity, for instance, pages with many connections could be considered authoritative pages, or "hubs." The information can be used to build Web visualization and navigation tools. The information can be used in conjunction with search engine results to lead users to portions of the Web that store content which may be of interest. In addition, the invention can be used to optimize the design and implementation of web crawlers based on statistics derived from the in and out degrees of nodes.

In one embodiment, the connectivity server is implemented on four Digital Equipment Corporation 300 MHz Alpha processors configured with 4 GB of RAM and a 48 GB disk. The graph 200 includes 230M nodes with about 360M edges. The average storage space for each URL is approximately 25 bytes for a total of 5.6 Gigabytes for the delta compressed URL database. In response to a user query, results can be generated at the rate of about one URL every 0.1 millisecond.

It is understood that the above-described embodiments are simply illustrative of the principles of the invention. Various other modifications and changes may be made by those skilled in the art which will embody the principles of the invention and fall within the spirit and scope thereof.

We claim:

1. A computerized method for representing the connectivity of Web pages, the Web pages including links between the Web pages, the links and Web pages being identified by names, comprising:

sorting the names of the Web pages in a memory;

delta encoding the sorted names while periodically storing full names as checkpoints in the memory, each delta encoded name and checkpoint having an assigned unique identification;

twice sorting a list of pairs of identifications that represent the links between the Web page, each pair of identifications including a first identification and a second identification, first according to the first identification of each pair to produce an inlist, and second according to the second identification of each pair to produce an outlist;

storing an array of elements in the memory, there being one array element for each Web page, each element including a first pointer to one of the checkpoints, a second pointer to an associated inlist of the Web page, and a third pointer to an associated outlist of the Web page; and indexing the array by a particular identification to locate connected Web pages.

2. The method of claim 1 wherein the names are uniform resource locators of the Web pages, and the uniform resource locators are sorted lexicographically.

3. The method of claim 1 wherein each delta encoded name and checkpoint includes a size indicating the number of common bytes in a shared prefix, bytes of the name that are different than the shared prefix, and the assigned unique identification of the Web page.

4. The method of claim 1 wherein the first identification of each pair identifies a particular Web page, and the second identification of each pair identifies another Web page linked to the particular Web page.

5. The method of claim 4 wherein the inlist identifies Web pages linked to the particular Web page, and the outlist identifies Web pages linked from the particular Web page.

6. The method of claim 1 further comprising receiving the name of a particular Web page, searching the checkpoints to locate a closest checkpoint, scanning the delta encoding names from the closest checkpoint to obtain the unique identification associated with the particular Web page, and indexing the array by the unique identifications to obtain the inlist and outlist of the particular Web page.

7. The method of claim 6 further comprising storing a list of pointers, there being one pointer for each unique identification, each pointer identifying the closest checkpoint for a particular unique identification.

8. The method of claim 7 further comprising indexing the list of pointers by identifications of the inlist and outlist of the particular page, scanning the delta encoded names to recover the names of Web pages linked to the particular Web page.

9. An apparatus for representing the connectivity of Web pages maintained by Web servers, the Web pages include links to other Web pages, the links and Web pages being identified by names, comprising:

a memory storing a sorted list of names of the Web pages;

means for delta encoding the sorted names while periodically storing full names as checkpoints in the memory, each delta encoded name and checkpoint having a unique identification;

means for sorting a list of pairs of identifications twice, each pair of identifications including a first identification and a second identification, first according to the first identification of each pair to produce and inlist, and second according to the second identification of each pair to produce and outlist;

an array of elements, there being one array element for each Web page, each element including a first pointer to one of the checkpoints, a second pointer to an associated inlist of the Web page, and a third pointer to an associated outlist of the Web page; and means for indexing the array by a particular identification to locate connected Web pages.

10. The apparatus of claim 9 wherein the names are uniform resource locators of the Web pages, and the uniform resource locators are sorted lexicographically.

11. The apparatus of claim 9 wherein each delta encoded name and checkpoint includes a size field to store the number of common bytes in a shared prefix, a delta value field to store the bytes of the name and checkpoint that are different than the shared prefix, and a field for storing the unique identification.

12. The apparatus of claim 9 wherein the first identification of each pair identifies a particular Web page, and the second identification of each pair identifies another Web page linked to the particular Web page.

13. The apparatus of claim 12 wherein the inlist identifies Web pages linked to the particular Web page, and the outlist identifies Web pages linked from the particular Web page.

14. The apparatus of claim 9 further comprising a client computer specifying the name of a particular Web page, means for searching the checkpoints to locate a closest checkpoint, means for scanning the delta encoding names from the closest checkpoint to obtain the unique identification associated with the particular Web page, and means for indexing the array by the unique identifications to obtain the inlist and outlist of the particular page.

15. A connectivity server connected to client computer of the Web, comprising:

means for sorting names of Web pages;

means for delta encoding the sorted names while periodically storing full names as checkpoints, each delta encoded name and checkpoint having a unique identification;

means for sorting a list of pairs of identifications twice, each pair of identifications including a first identification and a second identification, first according to the first identification of each pair to produce an inlist, and second according to the second identification of each pair to produce an outlist;

means for storing an array of elements in the memory, there being one array element for each Web page, each element including a first pointer to one of the checkpoints, a second pointer to an associated inlist of the Web page, and a third pointer to an associated outlist of the Web page; and means for indexing the array by a particular identification to locate connected Web pages.

16. A computer program product for representing the connectivity of Web pages, the web pages including links between the Web pages, the links and Web pages being identified by names, the computer program product for use in conjunction with a computer system, the computer program product comprising a computer readable storage medium and a computer program mechanism embedded therein, the computer program mechanism comprising instructions that:

sort the names of the Web pages in a memory;

delta encode the sorted names while periodically storing full names as checkpoints in the memory, each delta encoded name and checkpoint having an assigned unique identification;

twice sort a list of pairs of identifications that represent the links between the Web page, each pair of identifications including a first identification and a second identification, first according to the first identification of each pair to produce an inlist, and second according to the second identification of each pair to produce an outlist;

store an array of elements in the memory, there being one array element for each Web page, each element including a first pointer to one of the checkpoints, a second pointer to an associated inlist of the Web page, and a third pointer to an associated outlist of the Web page; and index the array by a particular identification to locate connected Web pages.

17. The computer program product of claim 16 wherein the names are uniform resource locators of the Web pages, and the uniform resource locators are sorted lexicographically.

18. The computer program product of claim 16 wherein each delta encoded name and checkpoint includes a size indicating the number of common bytes in a shared prefix, bytes of the name that are different than the shared prefix, and the assigned unique identification of the Web page.

19. The computer program product of claim 16 wherein the first identification of each pair identifies a particular Web page, and the second identification of each pair identifies another Web page.

20. The computer program product of claim 19 wherein the inlist identifies Web pages linked to the particular Web page, and the outlist identifies Web pages linked from the particular Web page.

21. The computer program product of claim 16 wherein the computer program mechanism further comprises instructions that receive the name of a particular Web page, search the checkpoints to locate a closest checkpoint, scan the delta encoding names from the closest checkpoint to obtain the unique identification associated with the particular Web page, and index the array by the unique identifications to obtain the inlist and outlist of the particular Web page.

22. The computer program product of claim 21 wherein the computer program mechanism further comprises instructions that store a list of pointers, there being one pointer for each unique identification, each pointer identifying the closest checkpoint for a particular unique identification.

23. The computer program product of claim 22 wherein the computer program mechanism further comprises instructions that index the list of pointers by identifications of the inlist and outlist of the particular page, and scans the delta encoded names to recover the names of Web pages linked to the particular Web page.

* * * * *